(12) United States Patent
Gu et al.

(10) Patent No.: US 12,344,740 B2
(45) Date of Patent: Jul. 1, 2025

(54) HEAT-RESISTANT THERMOPLASTIC ELECTROSTATIC DISSIPATIVE COMPOSITION

(71) Applicant: Covestro Deutschland AG, Leverkusen (DE)

(72) Inventors: Kevin Gu, Shanghai (CN); George Wang, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 18/703,755

(22) PCT Filed: Nov. 3, 2022

(86) PCT No.: PCT/EP2022/080621
§ 371 (c)(1),
(2) Date: Apr. 23, 2024

(87) PCT Pub. No.: WO2023/083674
PCT Pub. Date: May 19, 2023

(65) Prior Publication Data
US 2024/0327635 A1 Oct. 3, 2024

(30) Foreign Application Priority Data

Nov. 10, 2021 (WO) ................ PCT/CN2021/129746
Dec. 6, 2021 (EP) .................................... 21212416

(51) Int. Cl.
*C08L 67/02* (2006.01)
*C08K 3/04* (2006.01)

(52) U.S. Cl.
CPC .............. *C08L 67/02* (2013.01); *C08K 3/041* (2017.05); *C08L 2201/08* (2013.01); *C08L 2203/20* (2013.01)

(58) Field of Classification Search
CPC .............. C08L 2201/08; C08L 2203/20; C08L 2205/14
See application file for complete search history.

(56) References Cited

U.S. PATENT DOCUMENTS

| | | |
|---|---|---|
| 2,465,319 A | 3/1949 | Whinfield et al. |
| 3,047,539 A | 7/1962 | Pengilly |
| 3,419,634 A | 12/1968 | Vaughn, Jr. |
| 3,553,167 A | 1/1971 | Schnell et al. |
| 3,953,394 A | 4/1976 | Fox et al. |
| 4,075,173 A | 2/1978 | Maruyama et al. |
| 4,311,823 A | 1/1982 | Imai et al. |
| 4,334,053 A | 6/1982 | Freitag et al. |
| 4,584,360 A | 4/1986 | Paul et al. |
| 6,127,492 A | 10/2000 | Nagashima et al. |
| 2009/0118394 A1* | 5/2009 | Feldermann ............ C08L 69/00 523/351 |
| 2013/0153832 A1 | 6/2013 | Moniruzzaman |
| 2014/0197367 A1 | 7/2014 | Kumanan et al. |

FOREIGN PATENT DOCUMENTS

| | | | |
|---|---|---|---|
| CN | 112759899 A | * | 5/2021 |
| DE | 2232877 A1 | | 1/1974 |
| DE | 3007934 A1 | | 9/1981 |
| DE | 3832396 A1 | | 2/1990 |
| EP | 3181639 A1 | | 6/2017 |
| GB | 1552558 A | | 9/1979 |
| KR | 101936710 B1 | | 1/2019 |
| WO | WO 2023/284311 A1 | * | 1/2023 |

OTHER PUBLICATIONS

CN-112759899—A machine translation (May 7, 2021).*
WO 2023/284311 A1 (Jan. 19, 2023) machine translation.*
H. Schnell, "Chemistry and Physics of Polycarbonates", Interscience Publishers, 1964, pp. 28 ff.
International Search Report, PCT/EP2022/080621, date of mailing: Feb. 13, 2023, Authorized officer: Laure Mensah.

* cited by examiner

*Primary Examiner* — Ana L. Woodward
(74) *Attorney, Agent, or Firm* — John E. Mrozinski, Jr.

(57) ABSTRACT

The present application relates to a heat-resistant thermoplastic electrostatic dissipative composition and shaped articles made therefrom. The composition comprises the following components: an aromatic polycarbonate, a polyalkylene terephthalate, a carbon nanotube and a reinforcement material. The shaped article made from the composition according to the present invention has a good combination of heat-resistance, semi-conductivity and dimensional stability.

12 Claims, No Drawings

HEAT-RESISTANT THERMOPLASTIC ELECTROSTATIC DISSIPATIVE COMPOSITION

CROSS REFERENCE TO RELATED APPLICATIONS

This application is a national stage application under 35 U.S.C. § 371 of PCT/EP2022/080621, filed Nov. 3, 2022, which claims benefit of EP Application No. 21212416.8, filed Dec. 6, 2021 and PCT/CN2021/129746, filed Nov. 10, 2021, all of which are incorporated herein by reference in their entireties.

TECHNICAL FIELD

The present invention relates to a thermoplastic electrostatic dissipative composition. In particular, the present invention relates to a heat-resistant thermoplastic electrostatic dissipative composition and shaped articles made therefrom.

BACKGROUND ART

Thermoplastic electrostatic dissipative composition are widely used as packaging material for sensitive electronic devices, for example a tray, in integrated circuit (IC) industry. Because of their low electrical conductivity, neat thermoplastics with a surface electrical resistance in the level of >E15 (i.e., $10^{15}$) ohm/sq, can accumulate static charge which has high risk to damage the IC parts (such as chips, wafers, semiconductor devices, electronic parts or information recording media) during the packaging and transportation process. Normally, the surface electrical resistance of thermoplastic electrostatic dissipative composition is in range of E5-E9 ohm/sq. The conventional way to achieve such an electrical resistance is either to use inherent conductive polymers (ICP) or to add conductive fillers into the non-conductive thermoplastics.

During packaging process of IC parts, water or solvent bond solder is used. Therefore, the remained moistures or volatile organic compounds (VOC) must be removed; otherwise, they will cause cracking and blistering issue and the IC parts will be damaged. However, as the IC industry development is highly efficient, the time needed for drying of IC parts is shortened, a high temperature of drying for example 140° C. or more is required. The normal practice is to heat the chip together with the tray at a temperature in the range of 130° C.-140° C. for 6-24 hours. This requires the tray not only to be electrical conductive but also can sustain a heating process of high temperature for a specific long time without losing its original shape and dimension accuracy.

The commonly used thermoplastic resins for this application are polyphenylene oxide (PPO), polyphenylene sulfide (PPS), and the like with high glass transition temperature.

U.S. Pat. No. 6,127,492A discloses a thermoplastic resin composition comprising 5 to 45 parts by weight of carbon fiber, 0.1 to 10 parts by weight of conductive carbon black and 100 parts by weight of an aromatic polycarbonate resin and an aromatic polysulfone resin with excellent in heat-resistance and mechanical strength.

US2013153832A discloses a thermoplastic electrostatic dissipative (ESD) composite comprising a thermoplastic resin phase and a plurality of intermediate modulus carbon fibers dispersed within the thermoplastic resin phase. Polycarbonate is mentioned as a suitable thermoplastic resin.

US2014197367A discloses a thermoplastic electrostatic dissipative (ESD) composite comprising a thermoplastic resin phase and a filler composition comprising a conductive carbon black and a non-conductive polymer dispersed within the thermoplastic resin phase. The thermoplastic resin can be polycarbonate and PBT.

KR101936710B1 discloses a polycarbonate resin composition for electrostatic discharge and, more specifically, discloses a polycarbonate resin composition appropriate for manufacturing an article required for electrostatic discharge characteristics such as a TV bezel with excellent flame retardancy, dimension stability and heat resistance while displaying excellent electrostatic discharge characteristics with a carbon nanotube (CNT), and an article comprising the same.

EP 3181639A1 discloses a resin composition containing an aromatic polyester, an aromatic polycarbonate, a highly heat-resistant aromatic polycarbonate, a graft-copolymer (component D) containing a rubbery polymer, an ethylene copolymer, a silicate filler, an electric conductive filler and a phosphorus compound. The resin composition has a deflection temperature under load (A method) of 130° C. or higher and is suitable for an automobile exterior or outer panel member which can be coated at high temperatures and has a good surface property, good mechanical properties and high chemical resistance.

Aromatic polycarbonate resin has excellent mechanical strength and dimensional accuracy. However, it has a glass transition temperature Tg lower than 140° C.

Nevertheless, for a thermoplastic resin composition to be suitable for use in IC tray applications, it is desired that said thermoplastic resin composition has good heat-resistance and dimensional stability as well as excellence semi-conductive property.

Until now, no tray made from a composition of polymers with Tg lower than 140° C. has been satisfactory in terms of heat-resistance, dimensional stability and semi-conductive property.

Therefore, there remains a need in the art for a thermoplastic electrostatic dissipative composition with a good combination of heat-resistance, semi-conductivity and dimensional stability.

SUMMARY OF THE INVENTION

Thus, an object of the present invention is to provide a thermoplastic electrostatic dissipative composition with a good combination of heat-resistance, semi-conductivity and dimensional stability.

Another object of the present invention is to provide a shaped article made from the thermoplastic electrostatic dissipative composition with a good combination of heat-resistance, semi-conductivity and dimensional stability.

It has now been found, surprisingly, that such objects can be achieved by the present invention.

Thus, according to a first aspect, the present invention provides a heat-resistant thermoplastic electrostatic dissipative composition comprising, relative to the total weight of the composition:
  A) from 10 to 35 wt. % of an aromatic polycarbonate;
  B) from 40 to 78 wt. % of a polyalkylene terephthalate;
  C) from 1.5 to 5 wt. % of a carbon nanotube; and
  D) from 10 to 35 wt. % of a non-fibrous or non-needle-like reinforcement material,
  wherein the weight ratio of the polyalkylene terephthalate to the aromatic polycarbonate is from 1.5:1 to 6:1.

According to a second aspect, the present invention provides a shaped article made from the heat-resistant thermoplastic electrostatic dissipative composition according to the present invention.

According to a third aspect, the present invention provides a method for preparing the shaped article mentioned above, comprising injection moulding, extrusion moulding, blowing moulding or thermoforming the heat-resistant thermoplastic electrostatic dissipative composition according to the present invention.

The inventors have found that the article made from the heat-resistant thermoplastic electrostatic dissipative composition according to the present invention has a good combination of heat-resistance, semi-conductivity and dimensional stability. It has potential applications in many areas, for example in IC parts packaging, transportation, and processing.

Other subjects and characteristics, aspects and advantages of the present invention will be set forth in the description that follows, and in part, will be obvious from the description, or may be learned by practice of the present invention. It is to be understood that both the foregoing general description and the following detailed description are exemplary and explanatory only and are not restrictive, as claimed.

DETAILED DESCRIPTION OF THE INVENTION

In that which follows and unless otherwise indicated, the limits of a range of values are included within this range, in particular in the expressions "between . . . and . . . " and "from . . . to . . . ".

Throughout the present application, the term "comprising" is to be interpreted as encompassing all specifically mentioned features as well optional, additional, unspecified ones.

Unless defined otherwise, all technical and scientific terms used herein have the same meaning as commonly understood by one of ordinary skill in the art to which the present invention pertains. When the definition of a term in the present description conflicts with the meaning as commonly understood by those skilled in the art the present invention belongs to, the definition described herein shall apply.

Unless otherwise specified, all numerical values expressing amount of ingredients and the like which are used in the description and claims are to be understood as being modified by the term "about".

All percentages in the present application refer to weight percentage, unless otherwise specified.

Component A

According to the first aspect of the present invention, an aromatic polycarbonate is used in the heat-resistant thermoplastic electrostatic dissipative composition as component A.

Suitable aromatic polycarbonates used according to the present invention are known from the literature or may be produced by processes known from the literature (for the production of aromatic polycarbonates see for example Schnell, "Chemistry and Physics of Polycarbonates", Interscience Publishers, 1964 and DE-AS 1 495 626, DE-OS 2 232 877, DE-OS 2 703 376, DE-OS 2 714 544, DE-OS 3 000 610, DE-OS 3 832 396.

Aromatic polycarbonates are produced e.g. by the melt process or by reaction of diphenols with carbonic acid halides, preferably phosgene and/or with aromatic dicarboxylic acid dihalides, preferably benzene dicarboxylic acid dihalides, by the phase interface process, optionally using chain stoppers, for example monophenols and optionally using trifunctional or more than trifunctional branching agents, for example triphenols or tetraphenols.

Diphenols for the production of the aromatic polycarbonates are preferably those of the formula (I)

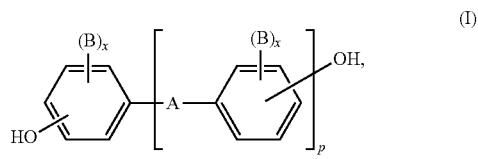

(I)

wherein

A is a single bond, $C_1$-$C_5$-alkylene, $C_2$-$C_5$-alkylidene, $C_5$-$C_6$-cycloalkylidene, —O—, —SO—, —CO—, —S—, —SO_2—, $C_6$-$C_{12}$-arylene, onto which further aromatic rings, optionally containing heteroatoms, may be condensed, or a group of the formula (II) or (III)

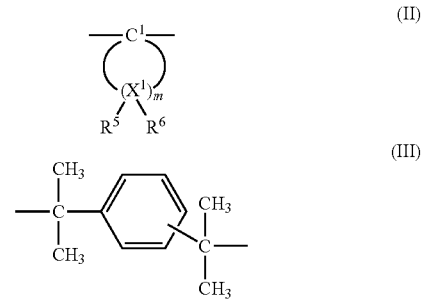

B is, in each case, $C_1$-$C_{12}$-alkyl, preferably methyl, halogen, preferably chlorine and/or bromine, x in each case, independently of each other, is 0, 1 or 2, p is 1 or 0, and $R^5$ and $R^6$ may be selected individually for each $X^1$, independently of each other, as hydrogen or $C_1$-$C_6$-alkyl, preferably hydrogen, methyl or ethyl, $X^1$ is carbon and m is an integer from 4 to 7, preferably 4 or 5, provided that $R^5$ and $R^6$ are both alkyl on at least one $X^1$ atom.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones and α,α-bis-(hydroxyphenyl)-diisopropyl-benzenes and their ring-brominated and/or ring-chlorinated derivatives.

Particularly preferred diphenols are 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethyl cyclohexane, 4,4'-dihydroxydiphenyl sulfide, 4,4'-dihydroxydiphenyl-sulfone and their di- and tetrabrominated or chlorinated derivatives such as for example 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

2,2-bis-(4-hydroxyphenyl)-propane (bisphenol A) is preferred in particular.

The diphenols may be used individually, or in any mixture.

The diphenols are known from the literature or may be obtained by processes known from the literature.

Suitable chain stoppers for the production of the thermoplastic, aromatic polycarbonates are for example phenol, p-chlorophenol, p-tert.-butyl phenol or 2,4,6-tribromophenol, but also long chain alkyl phenols such as 4-(1,3-tetramethylbutyl)-phenol according to DE-OS 2 842 005 or monoalkylphenol or dialkyl phenols containing a total of 8 to 20 C atoms in the alkyl substituents such as 3,5-di-tert.-butyl phenol, p-iso-octyl phenol, p-tert-octyl phenol, p-dodecyl phenol and 2-(3,5-dimethylheptyl)-phenol and 4-(3,5-dimethylheptyl)-phenol. The quantity of chain stoppers to be used is generally 0.5 mol. % to 10 mol. %, in relation to the molar sum of the diphenols used in each case.

The thermoplastic, aromatic polycarbonates may be branched in the known way, and preferably by incorporating 0.05 to 2.0 mol. % in relation to the sum of the diphenols used, of trifunctional or more than trifunctional compounds, for example those having three or more phenolic groups.

Both homopolycarbonates and copolycarbonates are suitable. 1 to 25 wt. %, preferably 2.5 to 25 wt. % (in relation to the total quantity of diphenols to be used) of polydiorganosiloxanes with hydroxyaryloxy terminal groups may also be used for the production of copolycarbonates according to Component A of the invention. These are known (see for example U.S. Pat. No. 3,419,634) or may be produced by processes known from the literature. The production of copolycarbonates containing polydiorganosiloxanes is described e.g. in DE-A 3 334 782.

Preferred polycarbonates in addition to the bisphenol A homopolycarbonates are the copolycarbonates of bisphenol A containing up to 15 mol. % in relation to the molar sum of diphenols, of other diphenols mentioned as preferred or particularly preferred, in particular 2,2-bis(3,5-dibromo-4-hydroxyphenyl)-propane.

Aromatic dicarboxylic acid dihalides for the production of aromatic polyestercarbonates are preferably the diacid dichlorides of isophthalic acid, terephthalic acid, diphenylether-4,4'-dicarboxylic acid and naphthaline-2,6-dicarboxylic acid.

Mixtures of diacid dichlorides of isophthalic acid and terephthalic acid in a ratio of 1:20 to 20:1 are preferred in particular.

When producing polyestercarbonates, a carbonic acid halide, preferably phosgene, is also used as a bifunctional acid derivative.

In addition to the monophenols already mentioned, their chlorocarbonic acid esters and the acid chlorides of aromatic monocarboxylic acids, which may optionally be substituted by $C_1$-$C_{22}$-alkyl groups or by halogen atoms, as well as aliphatic $C_2$-$C_{22}$ monocarboxylic acid chlorides are also possible chain stoppers for the production of the aromatic polyestercarbonates.

The quantity of chain stoppers is 0.1 to 10 mol. % in each case, in relation to mols of diphenols in the case of the phenolic chain stoppers, and to mols of dicarboxylic acid dichlorides in the case of the monocarboxylic acid chain stopper.

The aromatic polyestercarbonates may also have aromatic hydroxycarboxylic acids incorporated in them.

The aromatic polyestercarbonates may be either linear or branched in the known way (see also DE-A 2 940 024 and DE-A 3 007 934).

As branching agents it is possible to use e.g. trifunctional or polyfunctional carboxylic acid chlorides, such as trimesic acid trichloride, cyanuric acid trichloride, 3,3'-,4, 4'-benzophenone-tetracarboxylic acid tetrachloride, 1,4,5,8-naphthaline tetracarboxylic acid tetrachloride or pyromel-litic acid tetrachloride, in quantities of 0.01 to 1.0 mol. % (in relation to the dicarboxylic acid dichlorides used) or trifunctional or polyfunctional phenols, such as phloroglucinol, 4,6-dimethyl-2,4,6-tri-(4-hydroxyphenyl)-heptene-2,4,4-dimethyl-2,4-6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2, 6-bis (2-hydroxy-5-methyl-benzyl)-4-methyl-phenol, 2-(4-hydroxyphenyl)-2-(2,4-dihydroxyphenyl)-propane, tetra-(444-hydroxyphenyl sopropyl]-phenoxy)-methane, 1,4-bis[4,4'-dihydroxytriphenyl)-methyl-benzene, may be used as branching agents in quantities of 0.01 to 1.0 mol. % in relation to the diphenols used. Phenolic branching agents may be added with the diphenols, acid chloride branching agents may be introduced together with the acid chlorides.

As examples of aromatic polycarbonate, mention can be made to Makrolon® 2408, an aromatic polycarbonate having a weight average molecular weight of about 24,000 g/mol produced from bisphenol A and phosgene, Makrolon®2600 available from Covestro Polymers Co. Ltd, a linear bisphenol A polycarbonate, having a weight-average molecular weight of 26000 g/mol as determined by GPC in dichloromethane with polycarbonate as standard, and Makrolon FS2000, available from Covestro Polymers Co. Ltd, a linear bisphenol A polycarbonate, having a weight-average molecular weight of 20,500 g/mol as determined by GPC in dichloromethane with polycarbonate as standard.

Preferably, the aromatic polycarbonates used according to the present invention have a weight average molecular weight (Mw) of at least 10000 g/mol, preferably of from 20000 g/mol to 320000 g/mol, more preferably from 23000 to 28000 g/mol, particularly preferably from 24000 to 26000 g/mol, determined by GPC in dichloromethane with polycarbonate as standard.

Preferably, the polycarbonate is a linear thermoplastic aromatic polycarbonate. More preferably, the linear thermoplastic aromatic polycarbonate has a weight average molecular weight of from 20,000 to 32,000 g/mol, preferably from 23,000 to 28,000 g/mol, more preferably from 24,000 to 26,000 g/mol, determined by GPC in dichloromethane with polycarbonate as standard.

The thermoplastic aromatic polycarbonates may be used alone or in any mixture.

Advantageously, the aromatic polycarbonate is present in the composition according to the present invention in an amount ranging from 10 wt. % to 35 wt. %, preferably from 10 wt. % to 32 wt. %, more preferably from 12 wt. % to 30 wt. %, relative to the total weight of the composition.

Component B

According to the first aspect of the present invention, a polyalkylene terephthalate resin is used in the heat-resistant thermoplastic electrostatic dissipative composition as component B.

The polyalkylene terephthalate suitable in the present context include homo-polymeric and copolymeric resins, the molecular structure of which include at least one bond derived from a carboxylic acid, preferably excluding linkages derived from carbonic acid.

The alkylene units of the polyalkylene terephthalates which are suitable for use in the present invention contain from 2 to 5, preferably from 2 to 4 carbon atoms. The alkylene units may be straight chains or branched chains.

Preferably, the polyalkylene terephthalate is selected from polyethylene terephthalate, polypropylene terephthalate, polybutylene terephthalate, polyisobutylene terephthalate, polypentyl terephthalate, polyisopentyl terephthalate, and polyneopentyl terephthalate.

More preferably, the polyalkylene terephthalate is selected from polyethylene terephthalate and polybutylene terephthalate.

Most preferably, the polyalkylene terephthalate is polyethylene terephthalate.

These are known resins and may be prepared through condensation or ester interchange polymerization of the diol component with the diacid according to known methods. U.S. Pat. Nos. 2,465,319; 3,953,394 and 3,047,539, all incorporated herein by reference, disclose suitable methods for preparing such resins.

Polyethylene terephthalate characterized by an intrinsic viscosity of at least 0.2 and preferably about at least 0.4 deciliter/gram, as measured by the relative viscosity of an 8% solution in orthochlorophenol in accordance with ASTM D 4603-2011 by Glass Capillary Viscometer at about 25° C., is preferred. The upper limit is not critical but it generally does not exceed about 2.5 deciliters/gram. Especially preferred polyethylene terephthalate are those with an intrinsic viscosity in the range of 0.4 to 1.3 deciliter/gram, preferably of 0.6 to 1.0 deciliter/gram.

Polybutylene terephthalate characterized by a melt volume flow rate (MVR) in the range of 5 to 60 $cm^3$/10 min, preferably in the range of 8 to 20 $cm^3$/10 min, as measured in accordance with ISO 1133-1:2011 (250° C./2.16 kg), is preferred.

As examples of polyalkylene terephthalate useful in the composition according to the present invention, mention can be made to polyethylene terephthalate, such as, PET RT6020 available from Indorama Ventures Polymer Germany GmbH, and polybutylene terephthalate, such as, Pocan B 1600 available from Lanxess AG Germany.

Advantageously, the polyalkylene terephthalate is present in the composition according to the present invention in an amount ranging from 40 to 78 wt. %, preferably from 42 wt. % to 75 wt. %, more preferably from 43 wt. % to 73 wt. %, relative to the total weight of the composition.

Advantageously, the weight ratio of the polyalkylene terephthalate to the aromatic polycarbonate is from 1.5:1 to 6:1, preferably from 2:1 to 6:1.

Component C

According to the first aspect of the present invention, a carbon nanotube is used in the heat-resistant thermoplastic electrostatic dissipative composition as component C.

Carbon nanotubes (CNT) are tubes made of carbon with diameters typically measured in nanometers.

Carbon nanotubes comprise single-wall carbon nanotubes and multi-wall carbon nanotubes (MWCNT). Multi-wall carbon nanotubes consists of nested single-wall carbon nanotubes weakly bound together by van der Waals interactions in a tree ring-like structure. Carbon nanotubes also comprise tubes with an undetermined carbon-wall structure and diameters less than 100 nanometers.

Carbon nanotubes mixed with polymers can be potentially used in many applications because of their remarkable electrical conductivity, exceptional tensile strength and thermal conductivity. Carbon nanotubes can be directly mixed into melted polymer components in powder form or through masterbatches. The master batch method is to premix the CNT powder with a carrier polymer with optimized shearing and kneading process followed by a second compounding with final polymer components thus can usually achieve a better distribution of CNT particles into matrix polymers than direct powder compounding method.

For the purpose of the present invention, preferably, the carbon nanotube used in the composition according to the present invention comprises multi-wall carbon nanotubes.

Multi-wall carbon nanotubes suitable for the present invention is not particularly limited. Preferred multi-wall carbon nanotubes has a BET Nitrogen Surface Area from 100 $m^2$/g to 500 $m^2$/g, preferably from 200 $m^2$/g to 400 $m^2$/g, as measured according to ASTM D 3037 (1989).

As commercially available products for carbon nanotubes, mention can be made to GC 30 and GC21, commercially available from Shandong Dazhan Nano Materials Co., Ltd.

Advantageously, the carbon nanotube is present in the composition according to the present invention in amount ranging from 1.5 wt. % to 5 wt. %, preferably from 1.5 wt. % to 4.5 wt. %, relative to the total weight of the composition.

Component D

According to the first aspect of the present invention, a non-fibrous or non-needle-like reinforcement material is used in the heat-resistant thermoplastic electrostatic dissipative composition as component D.

Reinforcement materials suitable for the present invention include mineral fillers.

Examples of suitable mineral fillers are mica, talc, barium sulfate, silica, kaolin, titanium dioxide, aluminum hydroxide, magnesium hydroxide, feldspar, calcium carbonate, dolomite, vermiculite, bentonite, perlite, pyrophylite or the like.

Preferably, the mineral filler is selected from kaolin, talc, silica, and a mixture thereof. More preferably, the mineral filler is selected from kaolin, talc, and a mixture thereof. Most preferably, the mineral filler is talc.

Preferably, the reinforcement material is in platy shape, spherical shape or spherical-like shape.

When the reinforcement material is in spherical shape or spherical-like shape, preferably, the median particle diameter (d50) of the mineral filer is from 0.5 to 10 μm, more preferably from 2.5 to 8.0 μm, further preferably from 3 to 5 μm, with an upper diameter (d95) of from 6 to 34 μm, preferably from 6.5 to 25.0 μm, further preferably from 7 to 15 μm, and particularly preferably of 10 μm being preferred.

As commercial examples of reinforcement material useful in the composition according to the present invention, mention can be made to Ultra 5C available from IMI Fabi S.p.A., which is a product containing talc, HG90 available from KaMin LLC, which is a product containing kaolin, and AMOSIL FW600 available from Quarzwerke GmbH, which is a product containing silica.

Advantageously, the reinforcement material is present in the composition according to the present invention in an amount ranging from 10 wt. % to 35 wt. %, preferably from 10 wt. % to 30 wt. %, based on the total weight of the composition.

Additives

The heat-resistant thermoplastic electrostatic dissipative composition according to the present invention may further comprise one or more additives.

Preferably, the additive is selected from (i) heat stabilizers and antioxidants such as organic phosphites and phosphonites, STABILIZER 1010; (ii) processing aids; (iii) nucleating agents; (iv) internal lubricants and/or external lubricants; (v) flame retardants; (vi) mold release agents (PETS); and (vii) transesterification inhibitor (Phosphorous acid ($H_3PO_3$)).

The skilled in the art can adjust the amount of the additive as desired.

Advantageously, when one or more additional ingredients are present, the total weight, based on the total weight of the composition according to the present invention, is usually below 5 wt. %, preferably below 3 wt. % and more preferably below 2 wt. %.

In some preferred embodiments, the present invention provides a heat-resistant thermoplastic electrostatic dissipative composition comprising, relative to the total weight of the composition:
- A) from 10 to 35 wt. % of an aromatic polycarbonate;
- B) from 40 to 78 wt. % of a polyalkylene terephthalate selected from polyethylene terephthalate and polybutylene terephthalate;
- C) from 1.5 to 5 wt. % of multi-wall carbon nanotubes; and
- D) from 10 to 35 wt. % of a reinforcement material selected from talc, kaolin, silica, and a mixture thereof.

The inventors have found that the article made from the heat-resistant thermoplastic electrostatic dissipative composition according to the present invention has a good combination of heat-resistance, semi-conductivity and dimensional stability. In particular, the composition according to the present invention has improved Vicat softening temperature for example above 155° C. and HDT for example above 140° C. as well as excellent surface resistivity no more than E9 ohm/sq.

Preparation of the Heat-Resistant Thermoplastic Electrostatic Dissipative Composition The heat-resistant thermoplastic electrostatic dissipative composition according to the present invention can be prepared by mixing of the materials desired in the composition in a known manner and subjecting the mixture to melt compounding and melt extrusion at a temperature between 240° C. and 320° C. in conventional units, such as internal kneaders, and twin-screw extruders.

For example, the materials desired in the composition according to the present invention are first blended in a high speed mixer. Other low shear processes, including but not limited to hand mixing, can also accomplish this blending.

The blend is then fed into the throat of a twin-screw extruder via a hopper. Alternatively, at least one of the components can be incorporated into the composition by feeding directly into the extruder at the throat and/or downstream through a side stuffer. Additives can also be compounded into a masterbatch with a desired polymeric resin and fed into the extruder. The extruder is generally operated at a temperature higher than that necessary to cause the composition to flow. The extrudate is immediately quenched in a water bath and pelletized. The pellets can be one-fourth inch long or less as described. Such pellets can be used for subsequent moulding, shaping or forming.

Melt blending methods are preferred due to the availability of melt blending equipment in commercial polymer processing facilities.

Illustrative examples of equipment used in such melt processing methods include: co-rotating and counter-rotating extruders, single screw extruders, co-kneaders, and various other types of extrusion equipment.

The temperature of the melt in the processing is preferably minimized in order to avoid excessive degradation of the polymers. It is often desirable to maintain the melt temperature between 240° C. and 320° C. in the molten composition, although higher temperatures can be used provided that the residence time of the resin in the processing equipment is kept short.

In some embodiments, the melt processed composition exits processing equipment such as an extruder through small exit holes in a die. The resulting strands of the molten resin are cooled by passing the strands through a water bath. The cooled strands can be chopped into small pellets for packaging and further handling.

Shaped Articles

The heat-resistant thermoplastic electrostatic dissipative composition according to the present invention can be used, for example for the production of various types of shaped articles.

Thus, according to the second aspect, the present invention provides a shaped article made from the heat-resistant thermoplastic electrostatic dissipative composition according to the first aspect of the present invention.

The heat-resistant thermoplastic electrostatic dissipative composition according to the present invention can be molded into shaped articles such as, a heat-resistant tray or box for IC chip, housing for electronic device, etc.

The shaped article made from the heat-resistant thermoplastic electrostatic dissipative composition according to the present invention has a good combination of heat-resistance, semi-conductivity and dimensional stability.

Preparation of Shaped Articles

According to the third aspect, the present invention provides a method for preparing the shaped article mentioned above, comprising injection moulding, extrusion moulding, blowing moulding or thermoforming the heat-resistant thermoplastic electrostatic dissipative composition according to the present invention.

During preparing shaped articles with the composition according to this invention, the melting temperature for the moulding process preferably is in the range of 250-300° C., more preferably 255-290° C., even more preferably 260-280° C. The mold temperature could be in the range of 40-110° C., preferably 50-90° C., and the injection pressure can be in the range of 300-2500 bar, and preferably 500-2000 bar.

EXAMPLES

The following examples are put forth so that those of ordinary skill in the art can have a better understanding on how the composition disclosed and claimed herein can be made and evaluated, and are intended to be purely exemplary and are not intended to limit the disclosure. Efforts have been made to ensure accuracy with respect to numbers, but some errors and deviations should be accounted for.

Materials Used

Component A
- PC: Makrolon® 2408 available from Covestro, Ltd., aromatic polycarbonate resin pellets produced from bisphenol A and phosgene having a weight average molecular weight of about 24,000 g/mol, as measured by GPC in solvent dichloromethane and polycarbonate standard.

Component B
- PET: PET RT6020 available from Indorama Ventures Polymer Germany GmbH, polyethylene terephthalate with an intrinsic viscosity of 0.8 deciliter/gram.
- PBT: Pocan B 1600 available from Lanxess AG Germany, polybutylene terephthalate with a MVR of 10 $cm^3$/10 min (250° C./2.16 Kg, as measured according to ISO 1133-1:2011).

Component C
- Multi-wall carbon nanotubes: GC-21 PC masterbatch available from Shandong Dazhan Nano Materials Co., Ltd, having a BET Nitrogen Surface Area from 240-300 m²/g, as measured according to ASTM D 3037 (1989).

Component D

Talc: Ultra 5C available from IMI Fabi S.p.A.
Kaolin: HG90 available from KaMin LLC;
Wollastonite: Wollastonite 4w available from Imerys Talc America, Inc. having needle-like crystals;
Silica: AMOSIL FW600 available from Quarzwerke GmbH;
Glass fiber: MF 7980 available from Lanxess AG Germany.

Measurements

The following tests were carried out in the Examples.

Vicat softening temperature was determined on bars of dimensions 80 mm×10 mm×4 mm according to ISO 306: 2013 (50N; 120 K/h).

Heat distortion temperature (HDT) was measured on specimens with dimensions of 80 mm×10 mm×4 mm under a load of 0.45 MPa according to ISO 75-2:2013.

Surface resistivity was measured on specimens having an edge size of 60 mm and a thickness of 2 mm according to IEC 60093-1989.

Tensile stress at break was measured on injection molded specimens according to ISO 527-2:2012 (50 mm/min).

Izod unnotched impact strength were measured on specimens with dimensions of 80 mm×10 mm×4 mm at the temperature of 23° C. according to ISO180/A:2000 (23° C., 4 mm, 11 J).

Warpage of specimens was evaluated by the following method: the deformation of 5 locations on a molded plate was measured and the overall deformation was then graded according to the degree of deformation, wherein ++++ stands for undetectable deformation, +++ stands for slight and acceptable deformation, and ++ stands for big and unacceptable deformation, + stands for serious and unacceptable deformation.

Inventive Examples 1-14 and Comparative Examples 1-7

The heat-resistant thermoplastic electrostatic dissipative compositions of inventive examples 1-14 (Ex. 1-Ex. 14) and comparative examples 1-7 (CEx. 1-CEx. 7) containing the components as shown in Tables 1-2 were prepared in the form of granules on a ZSK25 twin-screw extruder available from Coperion, Werner and Pfleiderer (Germany) at a speed of 300 rpm and at a machine barrel temperature of 260-290° C., with a throughput of 30 kg/h.

Test bars and plates were prepared on the injection moulding machine with a melt temperature of 260° C., and a mold temperature of 60-80° C.

Vicat softening temperature, HDT, surface resistivity, tensile stress at break, Izod unnotched impact strength, warpage of the specimens were characterized and the results were summarized in Tables 1-2.

TABLE 1

| | | Unit | CEx. 1 | CEx. 2 | CEx. 3 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|---|---|
| Components | | | | | | | | | | | | | |
| A | PC | wt. % | 60.25 | 53.55 | 40.15 | 26.8 | 18.45 | 15.05 | 12.5 | 26.8 | 27.25 | 27.00 | 26.50 |
| B | PET | wt. % | 20.1 | 26.8 | 40.2 | 53.55 | 63.1 | 67.1 | 70.1 | — | 54.6 | 54.1 | 53.1 |
| | PBT | wt. % | — | — | — | — | — | — | — | 53.55 | — | — | — |
| C | MWCNT* | wt. % | 3.75 | 3.75 | 3.75 | 3.75 | 2.55 | 1.95 | 1.50 | 3.75 | 2.25 | 3.00 | 4.5 |
| D | Talc | wt. % | 15 | 15 | 15 | 15 | 15 | 15 | 15 | 15 | 15 | 15 | 15 |
| E | Phosphorous acid ($H_3PO_3$) | wt. % | 0.03 | 0.03 | 0.03 | 0.03 | 0.03 | 0.03 | 0.03 | 0.03 | 0.03 | 0.03 | 0.03 |
| | FACI L348 (PETS) | wt. % | 0.57 | 0.57 | 0.57 | 0.57 | 0.57 | 0.57 | 0.57 | 0.57 | 0.57 | 0.57 | 0.57 |
| | STABILIZER 1010 | wt. % | 0.3 | 0.3 | 0.3 | 0.3 | 0.3 | 0.3 | 0.3 | 0.3 | 0.3 | 0.3 | 0.3 |
| | PET/PC or PBT/PC weight ratio | | 0.33 | 0.50 | 1.00 | 2.00 | 3.42 | 4.46 | 5.61 | 2.00 | 2.00 | 2.00 | 2.00 |
| Properties | | | | | | | | | | | | | |
| Vicat softening temperature | | ° C. | 140 | 142 | 148 | 165 | 176 | 185 | 180 | 155 | 161 | 160 | 155 |
| HDT | | ° C. | 127 | 128 | 132 | 168 | 173 | 179 | 178 | 147 | 147 | 150 | 157 |
| Surface resistivity | | ohm/sq | 1E9** | 1E7 | 1E5 | 1E5 | 1E7 | 1E8 | 1E9 | 1E5 | 1E8 | 1E6 | 1E5 |
| Tensile stress at break | | MPa | NA | NA | NA | 62.0 | NA | NA | NA | 69.1 | NA | NA | NA |
| Izod unnotched impact strength | | kJ/m² | NA | NA | NA | 29 | NA | NA | NA | 44 | NA | NA | NA |

NA: not tested.

*the content of multi-wall carbon nanotube in Table 1 is for the multi-wall carbon nanotube itself rather than for the masterbatch.

**En = $10^n$

Table 1 illustrates the effect of PET/PC and PBT/PC weight ratio on the heat resistance of the composition.

Both Vicat softening temperature and HDT increases with the increase of PET/PC weight ratio, as demonstrated by a comparison between Ex. 1-Ex. 3 with CEx. 1-CEx. 3.

When the amount of PET was smaller than that of PC, HDT of the samples is not higher than 132° C., as demonstrated in CEx. 1-CEx. 3. When the amount of PET or PBT is larger than that of PC, HDT of the samples is not less than 147° C.

As compared with samples obtained with PET and PC (Ex. 1), the sample obtained with PBT and PC (Ex. 5) has higher tensile stress at break and Izod unnotched impact strength, but lower Vicat softening temperature and HDT.

Table 1 also illustrates the effect of MWCNT content on the surface resistance of the composition. As demonstrated by a comparison between Ex. 1-Ex. 8, the surface resistance decreased from 1E9 to 1E5 with the increase of MWCNT content in the composition.

temperature and HDT of the composition comprising them according to the present invention are surprising high.

The invention claimed is:

1. A heat-resistant thermoplastic electrostatic dissipative composition comprising, relative to the total weight of the composition:
   A) from 10 to 35 wt. % of an aromatic polycarbonate;
   B) from 40 to 78 wt. % of a polyalkylene terephthalate;
   C) from 1.5 to 5 wt. % of a carbon nanotubes; and
   D) from 10 to 35 wt. % of a non-fibrous or non-needle-like reinforcement material selected from mineral fillers, and optionally one or more additives selected from the group consisting of (i) heat stabilizers and antioxidants; (ii) processing aids; (iii) nucleating agents; (iv) internal lubricants and/or external lubricants; (v) flame retardants; (vi) mold release agents; and (vii) transesterification inhibitor, wherein the weight ratio of the polyalkylene terephthalate to the aromatic polycarbonate is from 1.5:1 to 6:1,

TABLE 2

| | | Unit | CEx. 4 | CEx. 5 | CEx. 6 | CEx. 7 | Ex. 1 | Ex. 9 | Ex. 10 | Ex. 11 | Ex. 12 | Ex. 13 | Ex. 14 |
|---|---|---|---|---|---|---|---|---|---|---|---|---|---|
| | | | Components | | | | | | | | | | |
| A | PC | wt. % | 26.8 | 28 | 26.8 | 26.8 | 26.8 | 26.8 | 26.8 | 28.45 | 25.15 | 23.45 | 21.7 |
| B | PET | wt. % | 53.55 | 56.1 | 53.55 | 53.55 | 53.55 | 53.55 | 53.55 | 56.90 | 50.20 | 46.90 | 44.1 |
| C | MWCNT* | wt. % | 3.75 | — | 3.75 | 3.75 | 3.75 | 3.75 | 3.75 | 3.75 | 3.75 | 3.75 | 3.3 |
| D | Talc | wt. % | — | 15 | — | — | 15 | — | — | 10 | 20 | 25 | 30 |
| | Kaolin | wt. % | — | — | — | — | — | 15 | — | — | — | — | — |
| | Wollastonite | wt. % | — | — | 15 | — | — | — | — | — | — | — | — |
| | Glass fibre | wt. % | — | — | — | 15 | — | — | — | — | — | — | — |
| | Silica | wt. % | — | — | — | — | — | — | 15 | — | — | — | — |
| E | Phosphorous acid (H$_3$PO$_3$) | wt. % | 0.03 | 0.03 | 0.03 | 0.03 | 0.03 | 0.03 | 0.03 | 0.03 | 0.03 | 0.03 | 0.03 |
| | FACI L348 (PETS) | wt. % | 0.57 | 0.57 | 0.57 | 0.57 | 0.57 | 0.57 | 0.57 | 0.57 | 0.57 | 0.57 | 0.57 |
| | STABILIZER 1010 | wt. % | 0.3 | 0.3 | 0.3 | 0.3 | 0.3 | 0.3 | 0.3 | 0.3 | 0.3 | 0.3 | 0.3 |
| | PET/PC weight ratio | | 2.00 | 2.00 | 2.00 | 2.00 | 2.00 | 2.00 | 2.00 | 2.00 | 2.00 | 2.00 | 2.03 |
| | | | Properties | | | | | | | | | | |
| Vicat softening temperature | | ° C. | 151 | 156 | 153 | 159 | 165 | 158 | 161 | 170 | 164 | 155 | 157 |
| HDT | | ° C. | 125 | 128 | 135 | 158 | 168 | 147 | 140 | 163 | 164 | 169 | 165 |
| Surface resistivity | | ohm/sq | 1E5** | >1E15 | 1E5 | 1E5 | 1E5 | 1E5 | 1E5 | 1E8 | 1E5 | 1E5 | 1E5 |
| Warpage | | | ++ | ++++ | + | ++ | ++++ | +++ | +++ | +++ | ++++ | ++++ | ++++ |

*the content of multi-wall carbon nanotube in Table 1 is for the multi-wall carbon nanotube itself rather than for the masterbatch.
**En = 10$^n$
++++ stands for undetectable deformation,
+++ stands for slight and acceptable deformation, and
++ stands for big and unacceptable deformation,
+ stands for serious and unacceptable deformation.

Table 2 illustrates the effect of different fillers and MWCNT on the properties of the composition obtained.

According to a comparison between Ex. 1, Ex. 9, Ex. 10, CEx. 6, and CEx. 4, the addition of talc, kaolin, wollastonite, glass fiber, and silica, increases both Vicat softening temperature and HDT.

It can be seen that the addition of talc increases Vicat softening temperature and HDT more substantially, as compared with the addition of kaolin, silica, glass fiber, or wallastonite.

According to a comparison between Ex. 1 and CEx. 5, the addition of MWCNT also increases Vicat softening temperature and HDT, especially HDT.

It can be seen that the composition according to the present invention has improved Vicat softening temperature (above 155° C.) and HDT (above 140° C.) as well as excellent surface resistivity (no more than E9 ohm/sq).

The inventors have found that although both Vicat softening temperature and HDT of aromatic polycarbonate and semi-crystalline polyester are low, but the Vicat softening wherein the composition has a Vicat softening temperature above 155° C. measured according to ISO 306:2013 with 50N and 120 K/h.

2. The composition according to claim 1, wherein the polyalkylene terephthalate is selected from the group consisting of polyethylene terephthalate, polypropylene terephthalate, polybutylene terephthalate, polyisobutylene terephthalate, polypentyl terephthalate, polyisopentyl terephthalate, and polyneopentyl terephthalate.

3. The composition according to claim 1, wherein the polyalkylene terephthalate is polyethylene terephthalate with an intrinsic viscosity in the range of 0.4 to 1.3 deciliter/gram, as measure in accordance with ASTM D 4603-2011.

4. The composition according to claim 1, wherein the polyalkylene terephthalate is polybutylene terephthalate with a melt volume flow rate (MVR) in the range of 5 to 60 cm$^3$/10 min, as measured in accordance with ISO 1133-1: 2011 (250° C./2.16 kg).

5. The composition according to claim 1, wherein the carbon nanotube comprises a multi-wall carbon nanotube.

6. The composition according to claim 1, wherein the carbon nanotube has a BET Nitrogen Surface Area from 100 $m^2/g$ to 500 $m^2/g$, as measured according to ASTM D 3037 (1989).

7. The composition according to claim 1, wherein the carbon nanotube is present in the composition in amount ranging from 1.5 wt. % to 4.5 wt. %, relative to the total weight of the composition.

8. The composition according to claim 1, wherein the reinforcement material is in platy shape, spherical shape or spherical-like shape.

9. The composition according to claim 1, wherein the composition has a HDT above 140° C. measured under a load of 0.45 MPa according to ISO 75-2:2013.

10. The composition according to claim 1, wherein the composition has a surface resistivity ranging from 1E5 to 1E9 ohm/sq measured according to IEC 60093-1989.

11. A shaped article made from the composition according to claim 1.

12. The shaped article according to claim 11, which is a heat-resistant tray or box, or a housing for electronic device.

* * * * *